(12) United States Patent
Lee Tai Keung

(10) Patent No.: US 7,375,984 B2
(45) Date of Patent: May 20, 2008

(54) ZERO VOLTAGE ZERO CURRENT SWITCHING CONVERTER

(75) Inventor: Steve Lee Tai Keung, Hong Kong (CN)

(73) Assignee: ASTEC Custom Power (HK) Ltd. (CN)

( * ) Notice: Subject to any disclaimer, the term of this patent is extended or adjusted under 35 U.S.C. 154(b) by 0 days.

(21) Appl. No.: 11/530,287

(22) Filed: Sep. 8, 2006

(65) Prior Publication Data
US 2007/0290656 A1 Dec. 20, 2007

Related U.S. Application Data

(60) Provisional application No. 60/805,027, filed on Jun. 16, 2006.

(51) Int. Cl.
H02M 3/335 (2006.01)
(52) U.S. Cl. .................. 363/16; 363/131; 315/247; 315/324
(58) Field of Classification Search ............ 363/16–20, 363/97, 131, 21.03, 132, 98, 56; 315/247, 315/324
See application file for complete search history.

(56) References Cited

U.S. PATENT DOCUMENTS

| 4,688,157 | A | 8/1987 | Rischmueller et al. |
| 4,977,493 | A | 12/1990 | Smith et al. |
| 5,206,800 | A | 4/1993 | Smith |
| 5,227,941 | A | 7/1993 | Rubin et al. |
| 5,886,884 | A | 3/1999 | Baek et al. |
| 5,898,581 | A | 4/1999 | Liu |
| 6,069,803 | A * | 5/2000 | Cross ................ 363/21.14 |
| 6,101,107 | A | 8/2000 | Assow |
| 6,169,671 | B1 | 1/2001 | Mao |
| 6,356,462 | B1 * | 3/2002 | Jang et al. ............ 363/17 |
| 6,377,481 | B1 | 4/2002 | Mantov |
| 6,490,177 | B1 * | 12/2002 | Figueroa ............ 363/21.03 |
| 6,987,379 | B2 | 1/2006 | Peron et al. |

FOREIGN PATENT DOCUMENTS

| CN | 1336715 | 2/2002 |
| CN | 1362779 | 8/2002 |
| CN | 1393985 | 1/2003 |

OTHER PUBLICATIONS

International Search Report for International Application No. PCT/IB2007/001608, dated Nov. 8, 2007.

(Continued)

Primary Examiner—Rajnikant B. Patel
(74) Attorney, Agent, or Firm—Harness, Dickey & Pierce, P.L.C.

(57) ABSTRACT

A power converter circuit includes an input switching circuit, an isolation circuit, a rectifier circuit that includes a least a pair of rectifiers, and an output circuit. The input switching circuit receives a first voltage and generates an AC voltage. The isolation circuit has a primary side configured to receive the AC voltage from the input switching circuit and a secondary side. The secondary side communicates with the rectifier circuit and the output circuit. The output circuit includes a secondary inductor and a diode. The secondary inductor communicates with a primary inductor and either the rectifier circuit or the secondary side. The diode communicates with the primary inductor, the secondary inductor, and the rectifier circuit. The secondary inductor inhibits current flow through the rectifier circuit and forces current flow through the diode when no voltage is applied to the primary side of the isolation circuit.

47 Claims, 8 Drawing Sheets

OTHER PUBLICATIONS

Written Opinion for International Application No. PCT/IB2007/001608, dated Nov. 8, 2007.

Mantov, George, et al., "Diode Recovery Current Suppression Circuit"; 5 pages.

* cited by examiner

US 7,375,984 B2

ZERO VOLTAGE ZERO CURRENT SWITCHING CONVERTER

CROSS-REFERENCE TO RELATED APPLICATIONS

This application claims the benefit of U.S. Provisional Application No. 60/805,027 filed on Jun. 16, 2006. The disclosure of the above application is incorporated herein by reference.

FIELD

The present disclosure relates to aspects of power converters.

BACKGROUND

The statements in this section merely provide background information related to the present disclosure and may not constitute prior art.

Switching power converters typically convert a DC voltage into an AC voltage by operating switching elements and then employ a rectifier and smoothing circuit to convert the AC voltage back to a DC voltage. A control circuit may control a duty cycle of the switching elements. Switching power converters allow for a variable output voltage by varying the duty cycle of the switching elements. The ratio of the output voltage and the input voltage is typically determined by the duty cycle of the switching elements.

As newer integrated circuits may provide for more electronic functions in smaller packages, it is essential for power converters to become smaller. One way to reduce the size of a power converter is to increase the operating frequency of the switching elements. However, as the frequency of the switching elements increase, the power loss of the power converter also increases. Increasing the frequency of the switching elements tends to increase electromagnetic interference generated by the power converter.

In order to minimize the disadvantages associated with increasing the frequency of the switching elements, it is desirable for the switching elements to turn on and off when the voltage and/or current of the switching elements becomes zero. By using power transistors as the switching elements, a parasitic output capacitance associated with the power transistors may be used to create a resonating LC circuit with a parasitic leakage inductance of an isolation transformer. The resonating LC circuit renders the current and voltage associated with the power transistors into a sinusoidal waveform forcing the current and voltage to pass through a zero crossing. The power transistors are then turned on and off at the zero crossing of the sinusoidal waveform. This minimizes overlap of falling current and rising voltage when the elements turn off and rising current and falling voltage when the elements turn on. This type of switching is often referred to as soft switching, whereas conventional switching is often referred to as hard switching.

In a conventional full bridge converter utilizing either type of switching, freewheeling current is generated in a rectifier portion of the converter when the switching elements turn on and off. The freewheeling current causes a relatively high reverse recovery current through one of the rectifiers when one of the switching elements turns on and through the other rectifier when the other switching elements turn on. The reverse recovery current causes voltage spikes at the blocking diode. The reverse recovery current also causes the temperature of the rectifier to increase, which correspondingly increases the reverse recovery current and corresponding voltage spike at that diode. Eventually, the voltage spikes rise to a level that exceed the rating of the typical output rectifier utilized on the secondary side of the transformer.

One attempt to limit the freewheeling current and corresponding voltage spikes have utilized a diode between the voltage rails at the output of the converter. The diode is placed in a location that is advantageous, as the voltage stress on the diode is substantially less than the voltage stress upon the output rectifiers, so that the diode may be used as a freewheeling diode. The output current flows through the freewheeling diode and consequently decreases or limits the reverse recovery current through the rectifiers when the switching elements of the bridge are all off. However, conventional output inductors or chokes do not insure that all output current flows through the freewheeling diode placed between the voltage rails. In a typical case, most of the freewheeling current flows through the output rectifiers rather than through the freewheeling diode. This leads to a higher reverse recovery current through the output rectifiers.

Another attempt to limit freewheeling current uses a secondary inductor having a first end connected to a primary inductor and a diode connected to a second end of the secondary inductor. The secondary inductor inhibits current flow through the pair of rectifiers when no voltage is applied to the primary side of the isolation circuit.

An alternative method to minimize losses due to reverse recovery current is by implementing a soft switch that switches at zero voltage on the leading leg switching elements and zero current on the lagging leg switching elements. Such circuits are often typically referred to as zero voltage zero current switching (ZVZCS) converters. A conventional ZVZCS full bridge converter is depicted in FIG. 1. The conventional ZVZCS converter uses a coupled choke N4 that is in phase with an output choke N3. A cathode of diode Dd is connected to a first side of N3. An anode of Dd is connected a first side of N4. A capacitor Ch is connected to the anode of Dd and a negative rail of the output circuit. A cathode of diode Dc is connected to a second side of N4, and an anode of Dc is connected to the negative rail of the output circuit. A cathode of Df is connected to the cathode of Dd and an anode of Df is connected to the negative rail of the output circuit. Ch is charged through a resonance leakage inductance of N4 during the active period. During the freewheeling period, Ch discharges causing current flowing through the primary side to reset to zero. Although this circuit is efficient, it requires many components, which limits the ability to minimize the size of the circuit.

SUMMARY

A power converter circuit includes an input switching circuit, an isolation circuit, a rectifier circuit that includes a least a pair of rectifiers, and an output circuit. The input switching circuit receives a first voltage and generates an AC voltage. The isolation circuit has a primary side configured to receive the AC voltage from the input switching circuit and a secondary side. The secondary side communicates with the rectifier circuit and the output circuit. The output circuit includes a secondary inductor and a diode. The secondary inductor communicates with a primary inductor and either the rectifier circuit or the secondary side. The diode communicates with the primary inductor, the secondary inductor, and the rectifier circuit. The secondary inductor can inhibit current flow through the rectifier circuit and force current flow through the diode when no voltage is applied to the primary side of the isolation circuit.

In other features, the diode can be one of an ultra-fast diode and a Schottky diode. The primary and secondary inductors can be coupled. The primary and secondary inductors can be wound on a common toroidal core. In other features, the primary inductor has a first number of turns and the secondary inductor has a second number of turns. The second number of turns can be less than the first number of turns. The first number of turns can be at least five times the second number of turns.

In other features, the input switching circuit includes a first set of switching elements on a leading leg of the input switching circuit and a second set of switching elements of a lagging leg of the input switching circuit. The first set transitions to on at a zero voltage crossing and the second set transitions to off at a zero current crossing.

In other features, the input circuit includes switching elements and the secondary inductor can inhibit current flow through the input switching circuit when no voltage is applied to a control terminal of the switching elements. The primary inductor induces a voltage across the secondary inductor. In other features the diode includes an anode and a cathode, the anode communicating with the rectifier circuit, and the cathode communicating with the secondary inductor. The cathode communicates with the primary inductor. The anode communicates with the primary inductor. The diode includes an anode and a cathode, the anode communicating with the secondary inductor, and the cathode can communicate with the secondary side of the isolation circuit. The cathode can communicate with the primary inductor.

A zero voltage zero current switching (ZVZCS) power converter circuit includes an input switching circuit having switching elements, the input switching circuit receiving a first voltage and generating an AC voltage. An isolation circuit includes a primary side and a secondary side. The primary side receives the AC voltage from the input switching circuit. A rectifier circuit communicates with the secondary side of the isolation circuit and includes at least a pair of rectifiers. An output circuit on the secondary side of the isolation circuit includes a secondary inductor that communicates with a primary inductor and one of the rectifier and the secondary side of the isolation circuit. A diode communicates with the primary inductor, the secondary inductor, and the rectifier circuit. The secondary inductor can inhibit current flow through the input switching circuit when no voltage is applied to a control terminal of the switching elements.

In other features, the diode can be one of an ultra-fast diode and a Schottky diode. The primary and secondary inductors can be coupled. The primary and secondary inductors can be wound on a common toroidal core. In some embodiments the primary inductor has a first number of turns and the secondary inductor has a second number of turns, the second number of turns being less than the first number of turns. The first number of turns can be at least five times the second number of turns.

In other features the diode inhibits current flow through the rectifier circuit and forces current through the diode when no voltage is applied to the primary side of the isolation circuit. The switching elements include a first set of switching elements on a leading leg of the input switching circuit and a second set of switching elements of a lagging leg of the input switching circuit. The first set transitions to one of on at a zero voltage crossing. The second set transitions to one of off at a zero current crossing. The primary inductor induces a voltage across the secondary inductor. The diode includes an anode and a cathode, the anode communicating with the rectifier circuit, and the cathode communicating with the secondary inductor. The cathode communicates with the primary inductor. The anode communicates with the primary inductor. The diode includes an anode and a cathode, the anode can communicate with the secondary inductor, and the cathode communicates with the secondary side of the isolation circuit. The anode can communicate with the primary inductor. The cathode can communicate with the primary inductor.

A power converter circuit includes a primary inductor at an output of the converter circuit, a flyback energy dissipation circuit that communicates with the primary inductor, and a secondary inductor that communicates with the primary inductor and the flyback energy dissipation circuit. The primary inductor induces a voltage across the secondary inductor, causing flyback energy to flow through the flyback energy dissipation circuit when the voltage is induced.

In some features the primary inductor has a first number of turns and the secondary inductor has a second number of turns, the second number of turns being less than the first number of turns. The first number of turns can be at least five times the second number of turns.

In other features an input switching circuit receives an input voltage and generates an AC signal output signal. The secondary inductor inhibits current flow through the input circuit. The input switching circuit includes a first set of switching elements on a leading leg of the input switching circuit and a second set of switching elements of a lagging leg of the input switching circuit. The first set transitions to one of on at a zero voltage crossing. The second set transitions to one of off at a zero current crossing. An isolation circuit has an input and an output side, the input side communicates with the input switching circuit. A rectifier circuit communicates with the output side of the isolation circuit. The rectifier circuit includes at least a pair of rectifiers. The flyback energy dissipation circuit includes a diode having a first and second end, the first end communicating with the primary inductor. The first end of the diode can be a cathode and the second end of the diode can be an anode. The cathode communicates with the secondary inductor. The anode communicates with the secondary inductor.

In other features the first end of the diode is an anode and the second end of the diode is a cathode. The anode communicates with the secondary inductor. The cathode communicates with the secondary inductor.

In other features, the diode can be one of an ultra-fast diode and a Schottky diode. The primary and secondary inductors can be coupled. The primary and secondary inductors can be wound on a common toroidal core. In some embodiments the primary inductor has a first number of turns and the secondary inductor has a second number of turns, the second number of turns being less than the first number of turns. The first number of turns can be five times the second number of turns.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
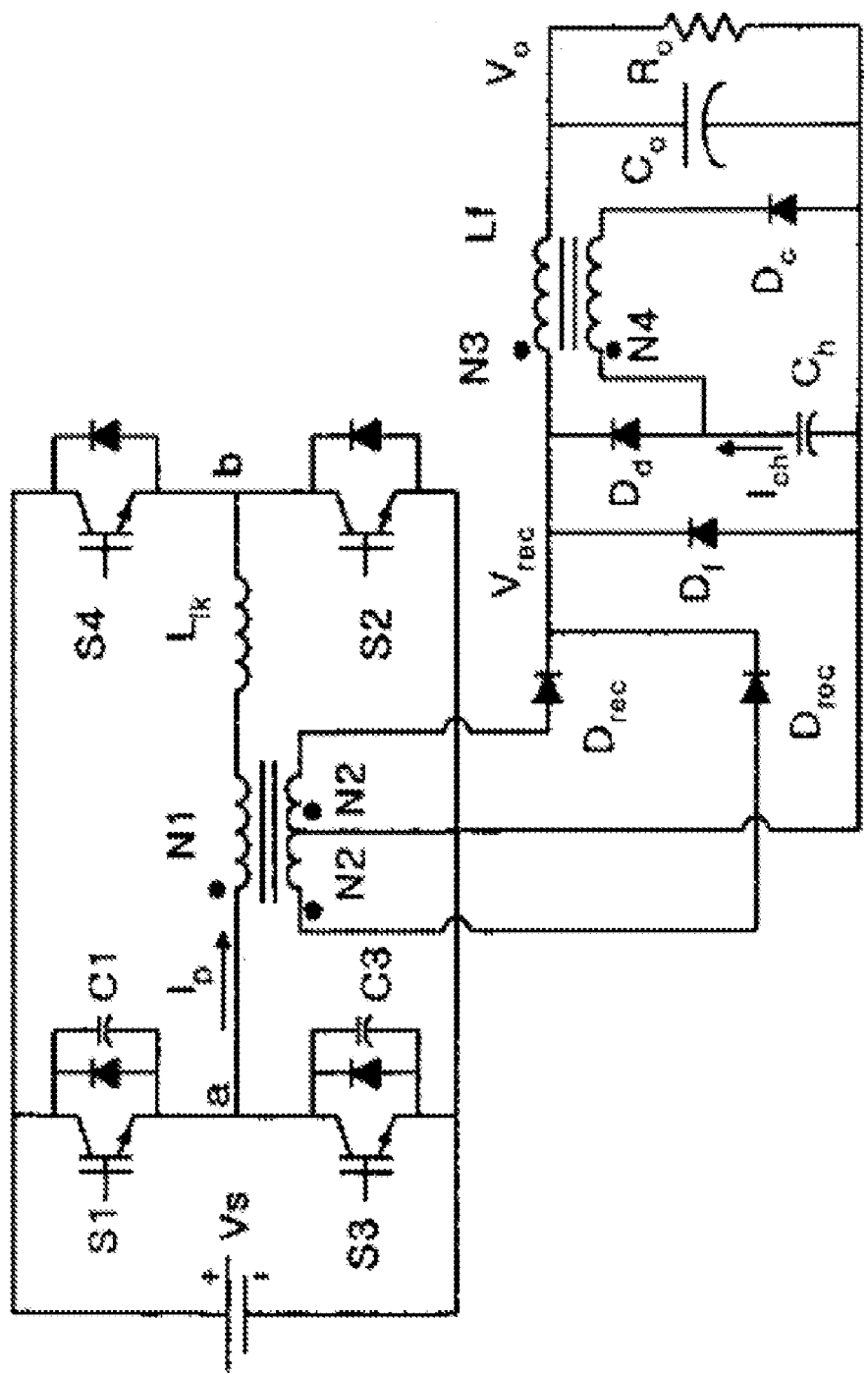
FIG. 1 is a circuit diagram of a zero voltage zero current switching (ZVZCS) converter according to the prior art.

The following description is merely exemplary in nature and is not intended to limit the present disclosure, application, or uses. It should be understood that throughout the drawings, corresponding reference numerals indicate like or corresponding parts and features.

Figure 2:
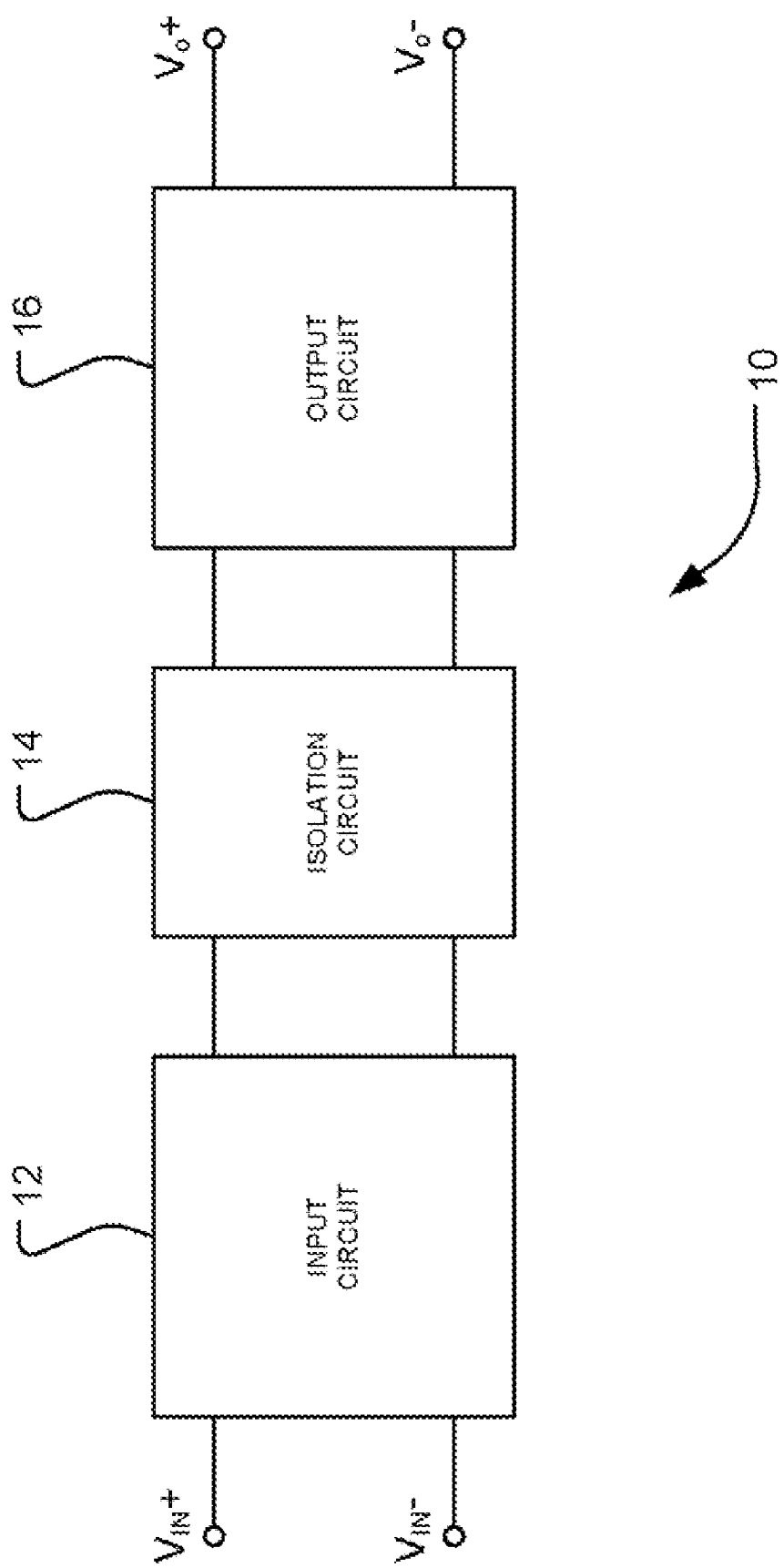
FIG. 2 is a block diagram of a bridge-type isolated buck converter.

Referring now to FIG. 2, a block diagram of a bridge-type isolated buck converter 10 is depicted. The input voltage Vin is applied to an input circuit 12 that performs a predefined function on input voltage Vin. Input circuit 12 generates an output applied to isolation circuit 14 which in turn generates an input applied to output circuit 16. Output circuit 16 receives the input and generates a voltage output Vo. With respect to this disclosure, input circuit 12 will be described, by way of a non-limiting example, as a bridge-type switching circuit, such as a full-bridge switching circuit. The description herein is equally applicable to any bridge-type circuit, including half-bridge and push-pull configurations. Isolation circuit 14 will be described, by way of a non-limiting example, with respect to an isolation transformer. Output circuit 16 will be described, by way of a non-limiting example, with respect to a buck converter. Although the present disclosure will be described as discussed with respect to FIG. 2, one skilled in the art will recognize that the subject of the disclosure may be equally applied to various power converter topologies including AC-DC and DC-DC converters. One skilled in the art will further recognize the applicability of the disclosure described herein when output circuit 16 is configured in connection with any of a number of known converter topologies including, but not limited to, hard switching full bridge converters, ZVS full bridge converters, push-pull converters, or a center-tapped or bridge-rectifier buck converter.

Figure 3:
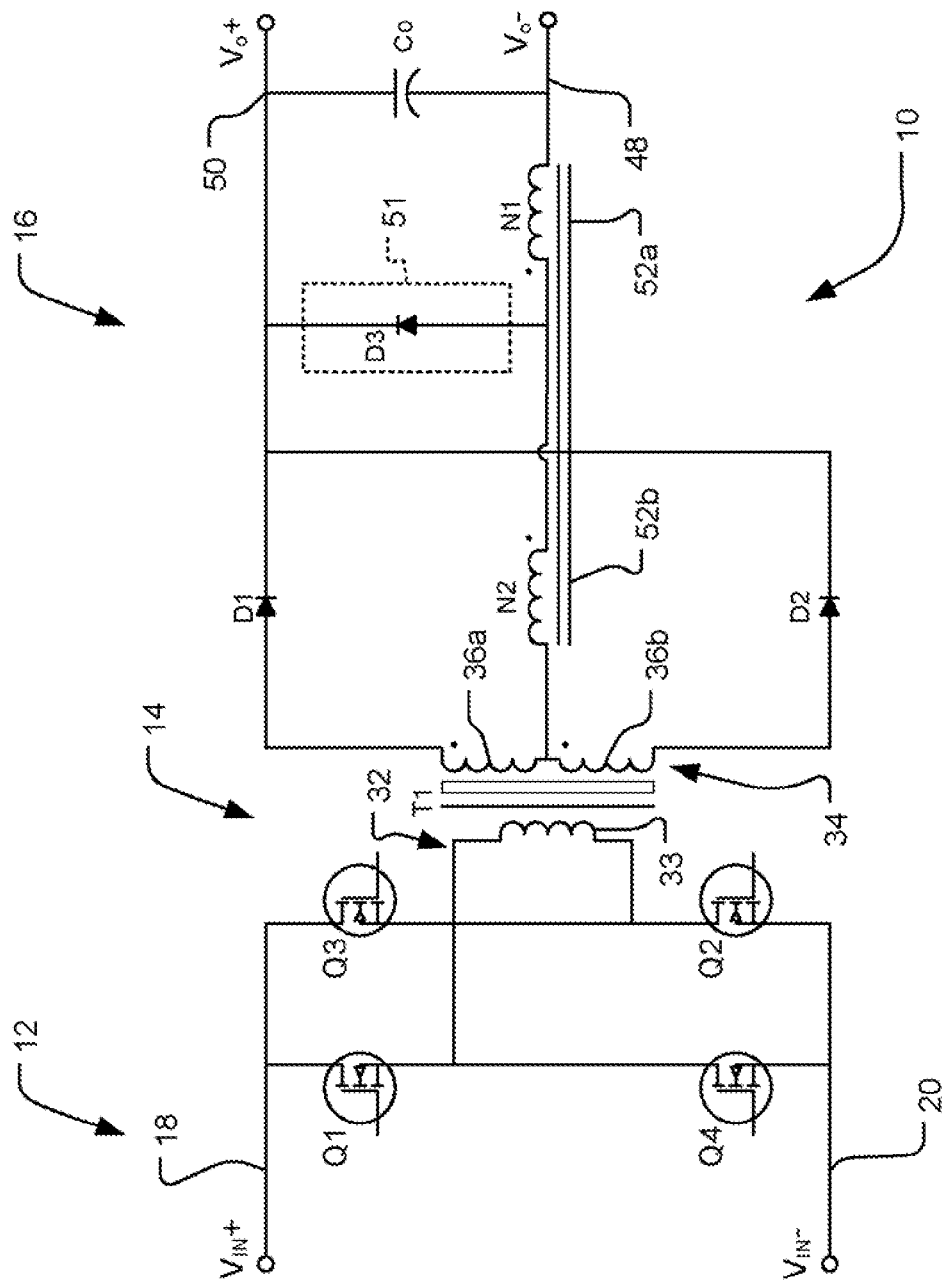
FIG. 3 is a circuit diagram corresponding to the block diagram of FIG. 2.

FIG. 3 depicts a circuit diagram corresponding to the block diagram of FIG. 2 for describing various embodiments. A voltage input Vin is applied across a respective positive rail 18 and negative rail 20 of input circuit 12. Bridge-type switching circuit 12 defined herein is a full-bridge switching network including switches Q1, Q2, Q3, Q4. Switches Q1 and Q4, which are collectively referred to as a leading leg, are connected in series across voltage rails 18, 20. Switches Q2 and Q3, which are collectively referred to as a lagging leg, are connected in series across voltage rails 18, 20. The switches shown in FIG. 3 are depicted as metal oxide semiconductor field effect transistor (MOSFET) switches, but one skilled in the art will recognize that other switch configurations, such as insulated gate bipolar transistors (IGBTs) may be used to provide the bridge-type switching circuit 12. As is well known in the art, switches Q1 and Q2 operate as a pair, and switches Q3, Q4 operate as a pair in order to convert the incoming DC signal Vin into an AC signal applied to the primary side of isolation circuit 14.

In some embodiments, isolation circuit 14 is embodied as an isolation transformer T1. Isolation transformer T1 includes a primary side 32 connected to bridge-type switching circuit 12 and a secondary side 34 connected to output circuit 16. T1 includes a primary winding 33 and a secondary winding 36 comprising a pair of center-tapped secondary windings 36a, 36b. The center-tap of secondary 36 defines a reference for the output voltage Vo.

As described above, output circuit 16 is embodied as a buck converter. The buck converter includes a pair of output rectifiers D1, D2 connected to the ends opposite the tap of respective secondary windings 36a, 36b. The anode of each output rectifier D1, D2 connects to the respective ends of secondary windings 36a, 36b. The cathode of each output rectifier D1, D2 connects to the positive voltage rail 50.

A primary inductor N1, also referred to as an output choke, is connected to the negative voltage rail 48 and a flyback energy dissipation circuit 51, which may include a diode D3 having an anode and a cathode. More specifically, N1 may be connected to the negative voltage rail 48 and the anode of diode D3. Output choke N1 includes a core 52a. The cathode of D3 is connected to the positive voltage rail 50. In some embodiments diode D3 is an ultra-fast diode or a Schottky diode. Ultra-fast diodes minimize reverse recovery current through diode D3, whereas Schottky diodes eliminate the reverse recovery current through diode D3. It should be noted however that Schottky diodes inherently have a lower reverse breakdown voltage than comparable ultra-fast diodes. The magnitudes of reverse voltage across diode D3 should therefore be considered when choosing a diode type for diode D3.

A secondary winding N2 is connected to N1 at one end and the center-tap of secondary winding 36 at the other end. Secondary winding N2 includes a core 52b. Windings N1 and N2 share a common core, which will generally be referred to as core 52. Winding N2 may have less turns than winding N1 to minimize adverse effects on zero voltage switching (ZVS) of the converter 10. In various embodiments, a 5:1 ratio may be used to determine the number of turns of winding N1 to the number of turns of winding N2. An output capacitor Co connects across the negative voltage rail 48 and the positive voltage rail 50 of the output Vo.

Switching elements Q1-Q4 are controlled in a conventional manner to achieve ZVS on the leading leg (Q1, Q4) of the converter. When the switches Q1-Q4 are turned off, a voltage across the output choke N1 is induced in secondary winding N2. The voltage induced across N2 rest circular current due to leakage inductance associated with the primary side 32 of T1 to zero. Thus, the induced voltage across N2 resets the primary current to zero. When the primary current is reset to zero, there is no current flowing through the lagging leg (Q2, Q3) of the input circuit 12 and thus the circuit also switches at zero current. Therefore, the circuit disclosed herein may be generally described as a zero voltage zero current switching (ZVZCS) converter.

The induced voltage across N2 reverse biases D1 and D2 causing the freewheeling current to flow through D3 rather than D1 or D2. Thus, current flow through D1 and D2 is minimized before Q1-Q2 or Q3-Q4 transition. Thus, reverse recovery current through D1 and D2 is minimized and in some cases eliminated. Minimizing the reverse recovery current through D1 and D2 also reduces voltage spikes across D1 and D2 improving efficiency of the power converter. Since the voltage across D3 is lower than the voltage across D1 or D2, a Schottky diode may be used for D3 to minimize, and in some cases eliminate, reverse recovery current through D3.

Conventional soft switch converters using a zero voltage switching control scheme may have a duty cycle loss due to the parasitic inductance of the power transformer. The circuit disclosed herein reduces the duty cycle loss by resetting the primary current to zero during the freewheeling period. More specifically, when the switches Q1-Q4 are turned on, the primary current ramps up from zero rather than from a positive or negative value, which reduces the duty cycle loss.

Figure 4A:
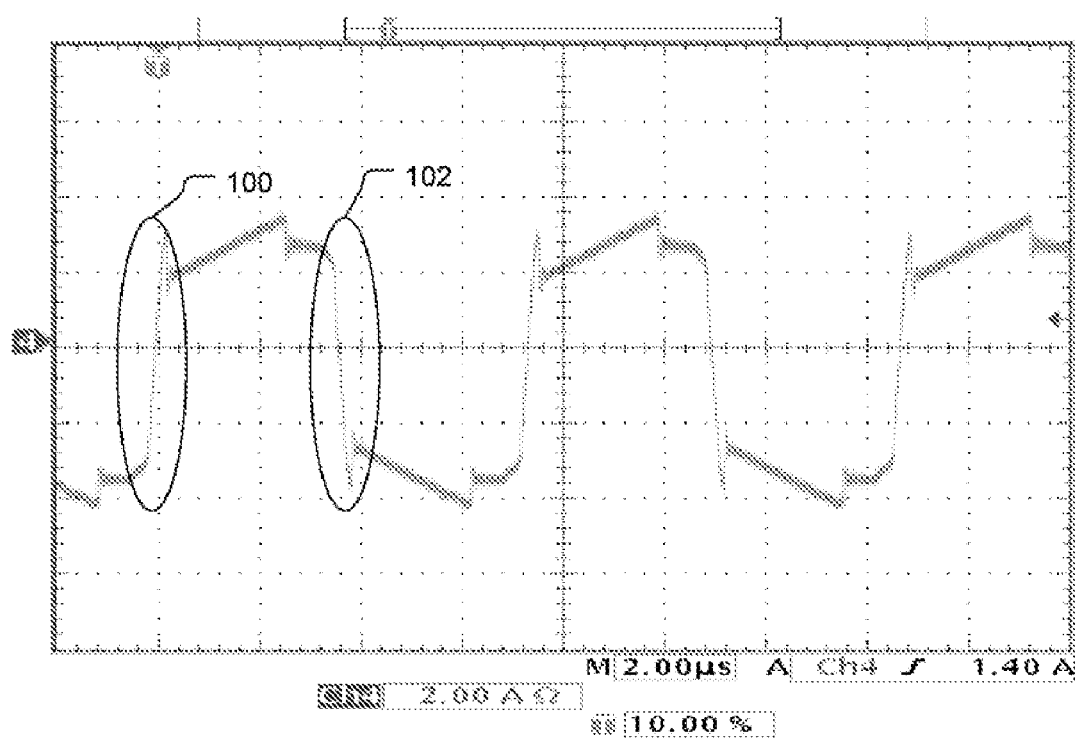
FIG. 4A is a graph depicting current flowing through the primary side of a conventional zero voltage switching (ZVS) converter versus time.

FIG. 4A depicts current flowing through the primary side of a conventional ZVS converter versus time. When the switching elements of the conventional ZVS converter turn on and off, the primary currently is zero only for a brief time period as it reverses polarity. Thus, reverse recovery current occurs during transitional periods shown at 100 and 102 when the current is not at the zero crossing.

Figure 4B:
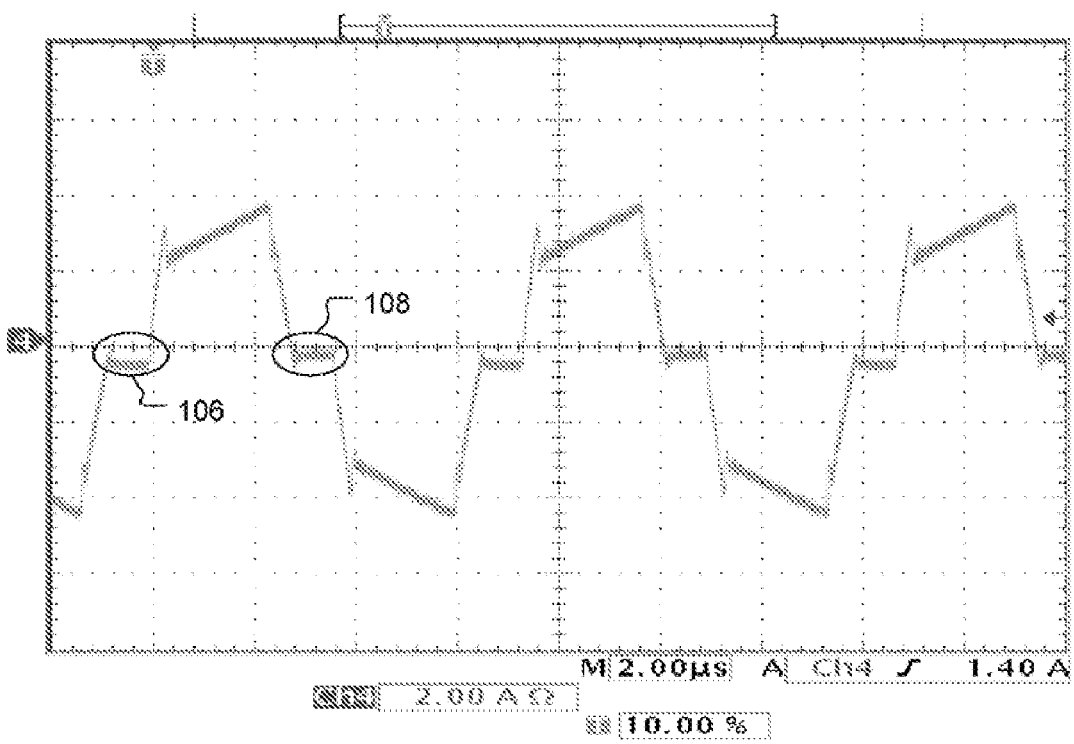
FIG. 4B is a graph depicting current flowing through a primary winding of the circuit diagram of FIG. 3 versus time.

FIG. 4B depicts current flowing through the primary winding 33 of transformer T1 versus time. When the switching elements Q1-Q4 of the converter 10 turn on and off, the current is minimized for an extended time period as shown at 106 and 108. Thus, the reverse current is minimized, and in some cases eliminated, during the extended period of time. Thus, the current resets to zero for every half cycle.

Figure 4C:
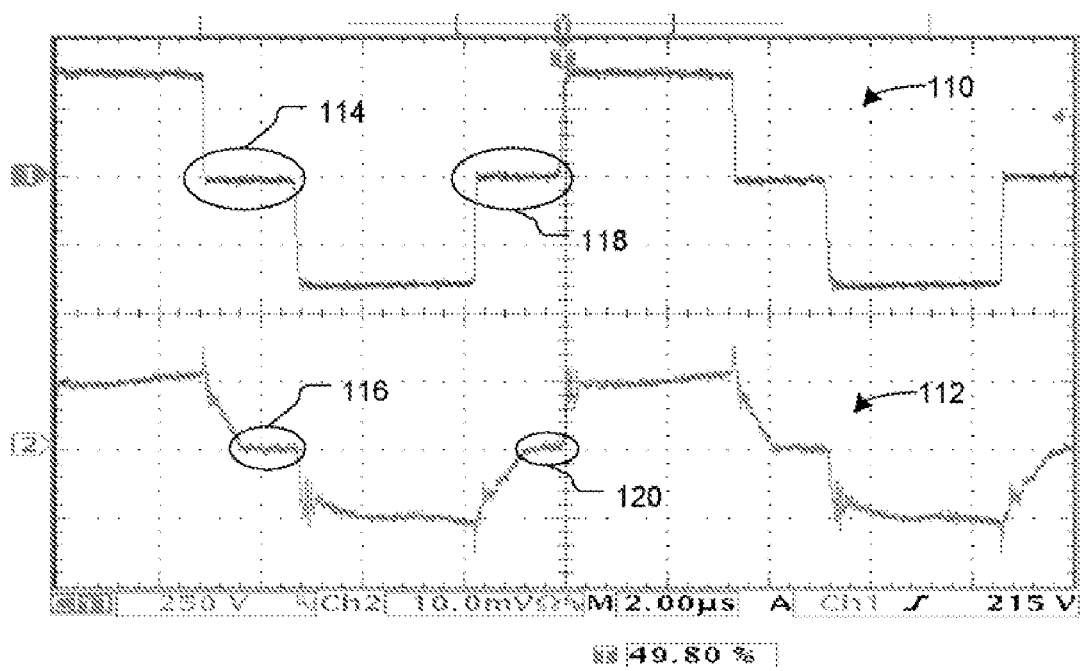
FIG. 4C is a graph depicting voltage and current of the primary winding of the circuit of FIG. 3 and versus time.

FIG. 4C depicts waveforms of the circuit disclosed herein. The voltage of the primary winding 33 of transformer T1 versus time is depicted at 110, while the primary winding 33 of transformer T1 current is shown at 112. As shown in FIG. 4C, when the voltage of the primary winding 33 of transformer T1 transitions from positive to negative, the voltage 110 of the primary winding 33 is zero for a first freewheeling period during the transition as shown at 114. During the first freewheeling period, the primary current 112 ramps to zero as shown at 116. At 118, there is a second freewheeling period where the voltage of the primary transformer is zero when transitioning from negative to positive. During the second period, the primary current ramps to zero as shown at 120. Thus, the reverse current is minimized, and in some cases eliminated, when the voltage of the primary side reverses polarity.

Figure 4D:
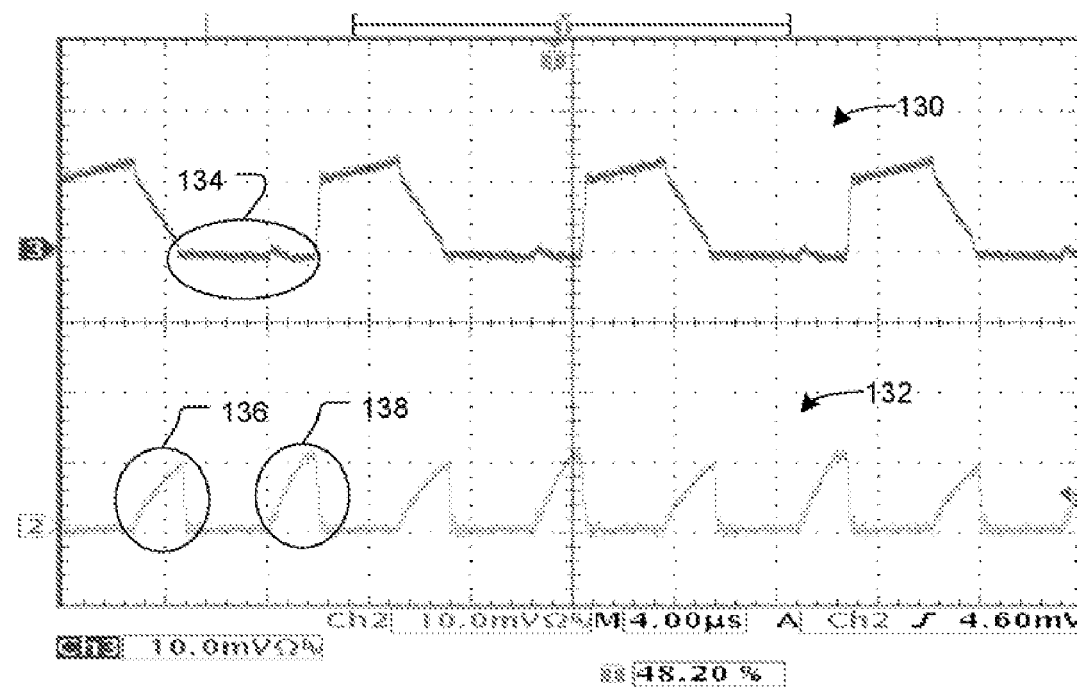
FIG. 4D is a graph depicting current flowing through a rectifier of a rectifier portion of the circuit of FIG. 3 and current flowing through a freewheeling diode verses time.

FIG. 4D depicts waveforms of the circuit disclosed herein. The current flowing through D2 is depicted versus time at 130 while the current flowing through D3 is shown at 132. As shown at 134, current flowing through D2 ramps to zero during the freewheeling period of the converter. In addition, during the freewheeling period, the current flowing through D3 ramps up. Therefore, the freewheeling current is forced to pass through D3 during the freewheeling period rather than D2.

Figure 4E:
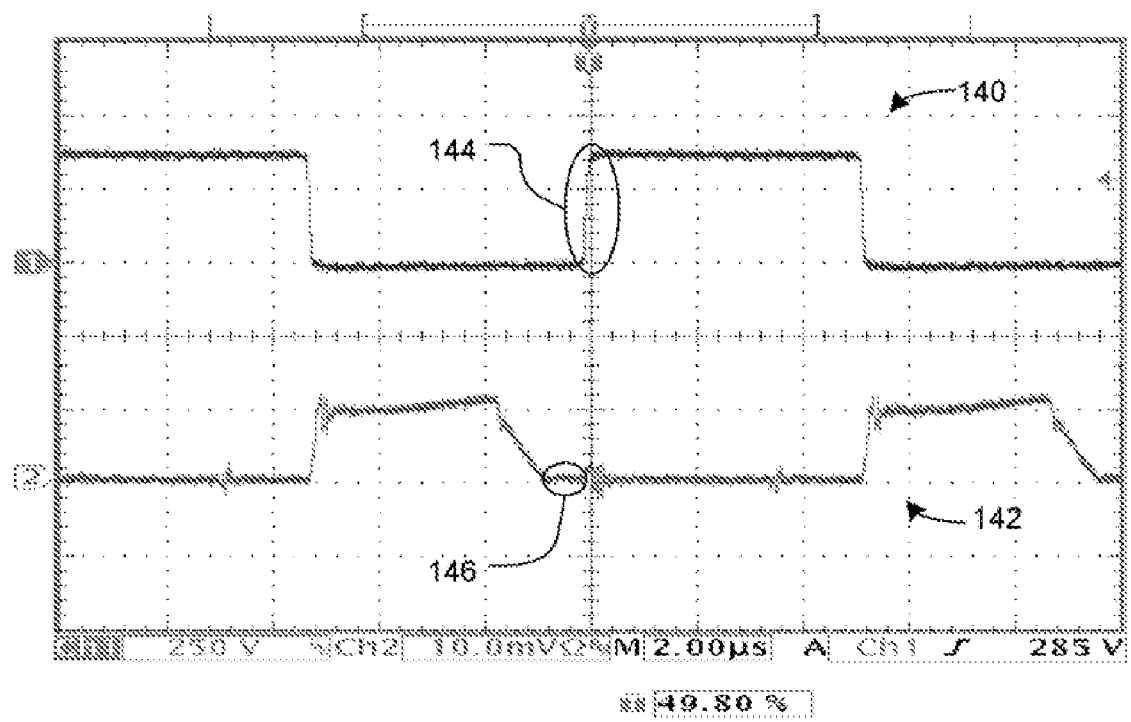
FIG. 4E is a graph depicting voltage across a lagging leg of an inverter portion of the circuit of FIG. 3 and current flowing through the lagging leg versus time.

FIG. 4E depicts waveforms of the circuit disclosed herein. A voltage across a drain and source of a switching element of the lagging leg of the input circuit 12 versus time is shown at 140. Current flowing through the same switching element versus time is shown at 142. As shown, the voltage of the switching element transitions to Vin+ at 144 signifying a transition of the switching element from on to off. When the switching element transitions, the current flowing through the switching element is zero as shown at 146. Therefore, the circuit is switching at zero current on the lagging leg of the input circuit 12.

Figure 5A:
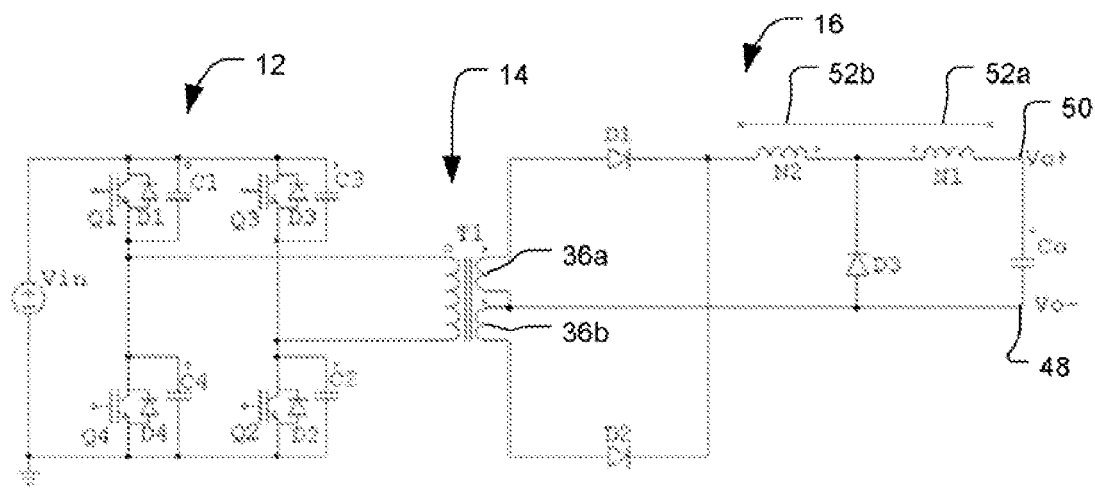
FIG. 5A is a circuit diagram of an alternate embodiment of the circuit of FIG. 3.

FIG. 5A depicts a second embodiment of the ZVZCS circuit. The cathode of each output rectifier D1, D2 connects to the respective ends of secondary windings 36a, 36b. The anode of each output rectifier D1, D2 connects to each other. One end of the primary inductor N1 is connected to the positive voltage rail 50 and the anode of diode D3. The cathode of D3 is connected to the negative voltage rail 48. The one end secondary winding N2 is connected to N1 at the respective phase dots and the anode of D3. The other end of N2 connects to the anodes of D1 and D2. The output capacitor Co connects to the negative voltage rail 48 and the other end of N1.

Figure 5B:
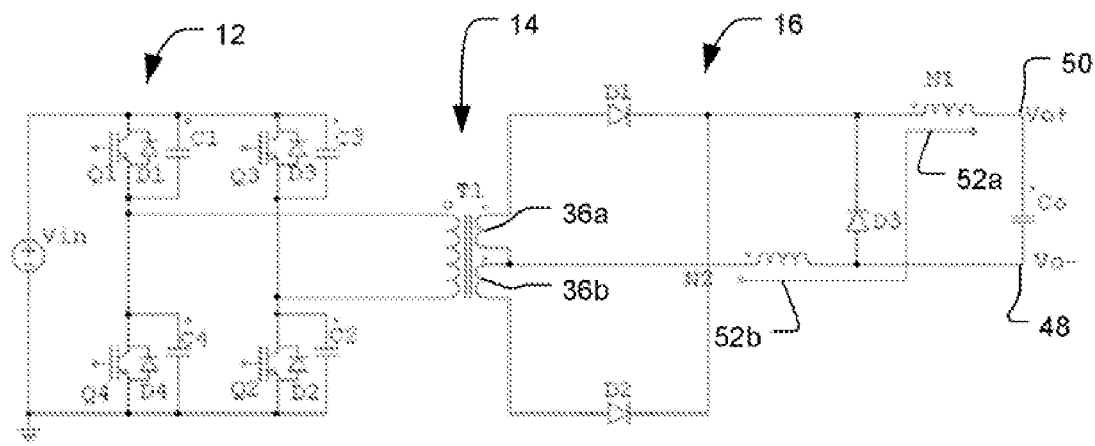
FIG. 5B is a circuit diagram of a second alternate embodiment of the circuit of FIG. 3.

FIG. 5B depicts a third embodiment of the ZVZCS circuit. The cathode of each output rectifier D1, D2 connects to the respective ends of secondary windings 36a, 36b. The anode of each output rectifier D1, D2 connect to each other. One end of the primary inductor N1 is connected to the positive voltage rail 50 and the other end is connected to the anodes of D1, D2, and D3. The cathode of D3 is connected to the negative voltage rail 48 and one end of the end secondary winding N2. The other end of N2 connects to the center-tap of secondary winding 36. The output capacitor Co connects across the negative voltage rail 48 and the positive voltage rail 50 of the output Vo.

Figure 5C:
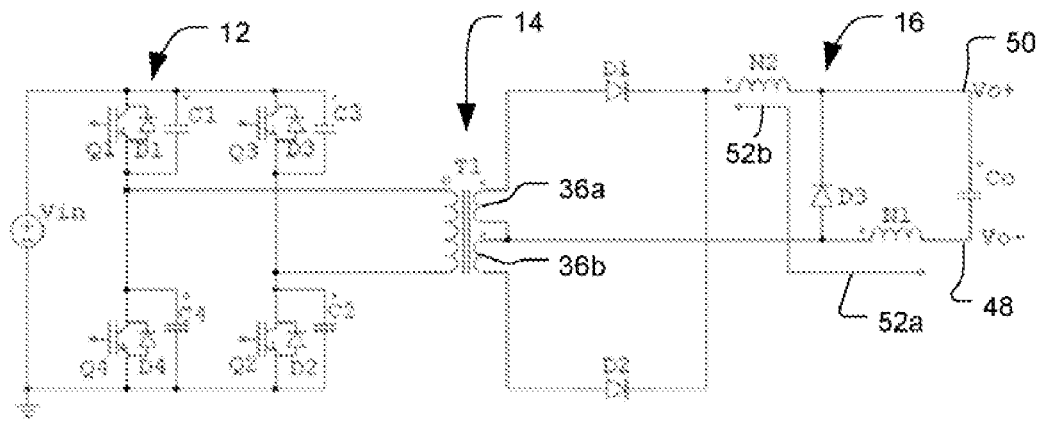
FIG. 5C is a circuit diagram of a third alternate embodiment of the circuit of FIG. 3.

FIG. 5C depicts a fourth embodiment of the ZVZCS circuit. The cathode of each output rectifier D1, D2 connects to the respective ends of secondary windings 36a, 36b. The anode of each output rectifier D1, D2 connect to each other and one end of the secondary inductor N2. The other end of N2 connects to the anode of D3. The cathode of D3 is connected to one end of the end primary inductor N1 and the center-tap of secondary winding 36. The other end of N1 connects to the negative voltage rail 48 and one end of output capacitor Co. The other end of Co connects to the positive voltage rail 50.

Figure 6A:
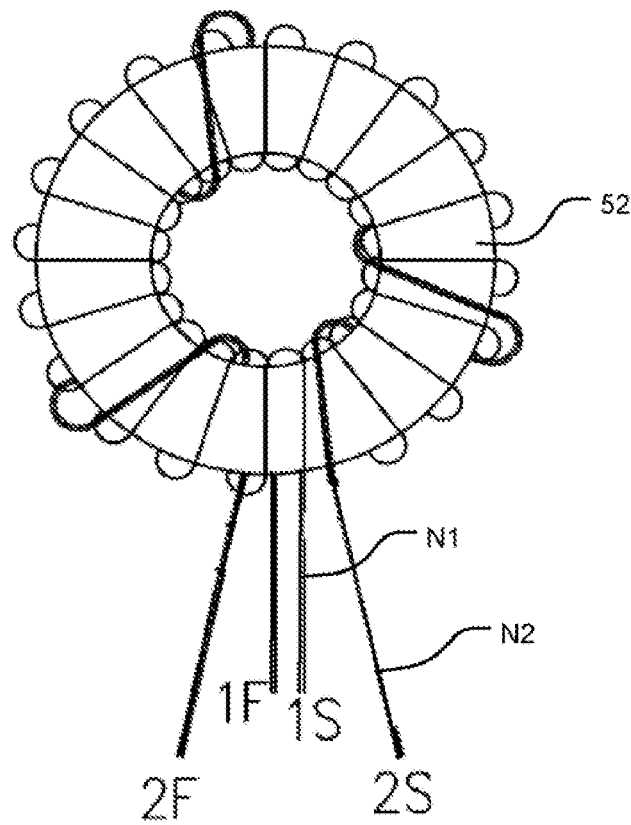
FIG. 6A is a winding diagram of coupled inductors that can be used with the circuits of FIGS. 5 and 5A-5C.

Referring now to FIG. 6A one of several embodiments is shown for coupled inductors N1 and N2. The embodiment of FIG. 6A minimizes a leakage inductance of coupled inductors N1 and N2. The windings of coupled inductors N1 and N2 can be wound around core 52 in the same direction and one on top of the other. Core 52 can be a toroidal core. Winding N1 includes a first end 1S and a second end 1F. Winding N2 includes a first end 2S and a second end 2F.

Figure 6B:
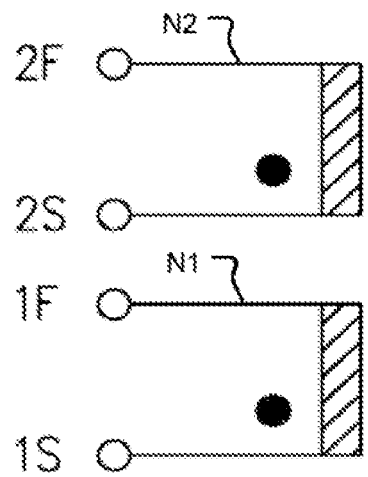
FIG. 6B is a schematic diagram of the coupled inductors of FIG. 6A.

Referring now to FIG. 6B a schematic diagram is shown of the coupled inductors of FIG. 6A. The schematic diagram includes phase dots that correspond with phase dots that are shown in the schematic diagrams of FIGS. 3 and 5A-5C. The phase dots therefore indicate how to connect the coupled inductors N1 and N2 of FIG. 6A to the circuits of FIGS. 3 and 5A-5C.

Those skilled in the art can now appreciate from the foregoing description that the broad teachings of the various embodiments can be implemented in a variety of forms. Therefore, while the various embodiments have been described in connection with particular examples thereof, the true scope of the teachings should not be so limited since other modifications will become apparent to the skilled practitioner upon a study of the drawings, specification, and the following claims.

What is claimed is:

1. A power converter circuit comprising:
an input switching circuit, the input switching circuit receiving a first voltage and generating an AC voltage;
an isolation circuit having a primary side and a secondary side, the primary side being configured to receive the AC voltage from the input switching circuit;
a rectifier circuit communicating with the secondary side of the isolation circuit, the rectifier circuit including at least a pair of rectifiers; and
an output circuit on the secondary side of the isolation circuit, the output circuit comprising:
a secondary inductor communicating with a primary inductor and one of the rectifier circuit or the secondary side of the isolation circuit; and
a diode communicating with the primary inductor, the secondary inductor, and the rectifier circuit, wherein the secondary inductor inhibits current flow through the rectifier circuit and forces current flow through the diode when no voltage is applied to the primary side of the isolation circuit.

2. The power converter circuit of claim 1 wherein the diode is one of an ultra-fast diode and a Schottky diode.

3. The power converter circuit of claim 1 wherein the primary and secondary inductors are coupled.

4. The power converter circuit of claim 3 wherein the primary and secondary inductors are wound on a toroidal core.

5. The power converter circuit of claim 1 wherein the primary inductor has a first number of turns and the secondary inductor has a second number of turns, the second number of turns being less than the first number of turns.

6. The power converter circuit of claim 5 wherein the first number of turns is at least five times the second number of turns.

7. The power converter circuit of claim 1 wherein the input switching circuit comprises a first set of switching elements on a leading leg of the input switching circuit and a second set of switching elements of a lagging leg of the input switching circuit, the first set transitioning to on at a zero voltage crossing, and the second set transitioning to off at a zero current crossing.

8. The power converter circuit of claim 1 wherein the input circuit includes switching elements and the secondary inductor inhibits current flow through the input switching circuit when no voltage is applied to a control terminal of the switching elements.

9. The power converter circuit of claim 1 wherein the primary inductor induces a voltage across the secondary inductor.

10. The power converter circuit of claim 1 wherein the diode comprises an anode and a cathode, the anode communicating with the rectifier circuit, and the cathode communicating with the secondary inductor.

11. The power converter circuit of claim 10 wherein the cathode communicates with the primary inductor.

12. The power converter circuit of claim 10 wherein the anode communicates with the primary inductor.

13. The power converter circuit of claim 1 wherein the diode comprises an anode and a cathode, the anode communicating with the secondary inductor, and the cathode communicating with the secondary side of the isolation circuit.

14. The power converter circuit of claim 13 wherein the anode communicates with the primary inductor.

15. The power converter circuit of claim 13 wherein the cathode communicates with the primary inductor.

16. A zero voltage zero current switching (ZVZCS) power converter circuit comprising:
an input switching circuit having switching elements, the input switching circuit receiving a first voltage and generating an AC voltage;
an isolation circuit having a primary side and a secondary side, the primary side being configured to receive the AC voltage from the input switching circuit;
a rectifier circuit communicating with the secondary side of the isolation circuit, the rectifier circuit including at least a pair of rectifiers; and
an output circuit on the secondary side of the isolation circuit, the output circuit comprising:
a secondary inductor communicating with a primary inductor and one of the rectifier and the secondary side of the isolation circuit; and
a diode communicating with the primary inductor, the secondary inductor, and the rectifier circuit, wherein the secondary inductor inhibits current flow through the input switching circuit when no voltage is applied to a control terminal of the switching elements.

17. The ZVZCS power converter circuit of claim 16 wherein the diode is one of an ultra-fast diode and a Schottky diode.

18. The ZVZCS power converter circuit of claim 16 wherein the primary and secondary inductors are coupled.

19. The ZVZCS power converter circuit of claim 18 wherein the primary and secondary inductors are wound on a toroidal core.

20. The ZVZCS power converter circuit of claim 16 wherein the primary inductor has a first number of turns and the secondary inductor has a second number of turns, the second number of turns being less than the first number of turns.

21. The ZVZCS power converter circuit of claim 20 wherein the first number of turns is at least five times the second number of turns.

22. The ZVZCS power converter of claim 16 wherein the diode inhibits current flow through the rectifier circuit and forces current through the diode when no voltage is applied to the primary side of the isolation circuit.

23. The ZVZCS power converter of claim 16 wherein the switching elements comprise a first set of switching elements on a leading leg of the input switching circuit and a second set of switching elements of a lagging leg of the input switching circuit, the first set transitioning to on at a zero voltage crossing, and the second set transitioning to off at a zero current crossing.

24. The ZVZCS power converter circuit of claim 16 wherein the primary inductor induces a voltage across the secondary inductor.

25. The ZVZCS power converter circuit of claim 16 wherein the diode comprises an anode and a cathode, the anode communicating with the rectifier circuit, and the cathode communicating with the secondary inductor.

26. The ZVZCS power converter circuit of claim 25 wherein the cathode communicates with the primary inductor.

27. The ZVZCS power converter circuit of claim 25 wherein the anode communicates with the primary inductor.

28. The ZVZCS power converter circuit of claim 16 wherein the diode comprises an anode and a cathode, the anode communicating with the secondary inductor, and the cathode communicating with the secondary side of the isolation circuit.

29. The ZVZCS power converter circuit of claim 28 wherein the anode communicates with the primary inductor.

30. The ZVZCS power converter circuit of claim 28 wherein the cathode communicates with the primary inductor.

31. A power converter circuit comprising:
   a primary inductor at an output of the converter circuit;
   a flyback energy dissipation circuit communicating with the primary inductor; and
   a secondary inductor communicating with the primary inductor and the flyback energy dissipation circuit, the primary inductor inducing a voltage across the secondary inductor, causing flyback energy to flow through the flyback energy dissipation circuit when the voltage is induced.

32. The power converter circuit of claim 31 wherein the primary inductor has a first number of turns and the secondary inductor has a second number of turns, the second number of turns being less than the first number of turns.

33. The power converter circuit of claim 32 wherein the first number of turns is at least five times the second number of turns.

34. The power converter circuit of claim 31 wherein the primary and secondary inductors are mutually coupled.

35. The power converter circuit of claim 34 wherein the primary and secondary inductors are wound on a toroidal core.

36. The power converter circuit of claim 31 further comprising an input switching circuit receiving an input voltage and generating an AC signal output signal, wherein the secondary inductor inhibits current flow through the input circuit.

37. The power converter circuit of claim 36 wherein the input switching circuit comprises a first set of switching elements on a leading leg of the input switching circuit and a second set of switching elements of a lagging leg of the input switching circuit, the first set transitioning to on at a zero voltage crossing, and the second set transitioning to off at a zero current crossing.

38. The power converter circuit of claim 37 further comprising an isolation circuit having an input and an output side, the input side communicating with the input switching circuit.

39. The power converter circuit of claim 38 further comprising a rectifier circuit communicating with the output side of the isolation circuit, the rectifier circuit including at least a pair of rectifiers.

40. The power converter circuit of claim 39 wherein said flyback energy dissipation circuit comprises a diode having a first and second end, the first end communicating with the primary inductor.

41. The power converter circuit of claim 40 wherein the diode is one of an ultra-fast diode and a Schottky diode.

42. The power converter circuit of claim 40 wherein the first end of the diode is a cathode and the second end of the diode is an anode.

43. The power converter circuit of claim 42 wherein the cathode communicates with the secondary inductor.

44. The power converter circuit of claim 42 wherein the anode communicates with the secondary inductor.

45. The power converter circuit of claim 40 wherein the first end of the diode is an anode and the second end of the diode is a cathode.

46. The power converter circuit of claim 45 wherein the anode communicates with the secondary inductor.

47. The power converter circuit of claim 45 wherein the cathode communicates with the secondary inductor.

* * * * *